United States Patent
Aluvala et al.

(10) Patent No.: US 11,410,565 B2
(45) Date of Patent: *Aug. 9, 2022

(54) SYSTEMS FOR CLASSROOM MEDIA SHARING

(71) Applicant: AIRWATCH LLC, Atlanta, GA (US)

(72) Inventors: Suman Aluvala, Bangalore (IN); Dheeraj Bhati, Bangalore (IN); Naveen Mableshwar Hedge, Bangalore (IN); Ashish Maan, Bangalore (IN)

(73) Assignee: AIRWATCH LLC, Atlanta, GA (US)

(*) Notice: Subject to any disclaimer, the term of this patent is extended or adjusted under 35 U.S.C. 154(b) by 67 days.

This patent is subject to a terminal disclaimer.

(21) Appl. No.: 16/920,527

(22) Filed: Jul. 3, 2020

(65) Prior Publication Data
US 2020/0335000 A1 Oct. 22, 2020

Related U.S. Application Data

(63) Continuation of application No. 16/373,332, filed on Apr. 2, 2019, now Pat. No. 10,706,733, which is a
(Continued)

(30) Foreign Application Priority Data

Nov. 17, 2015 (IN) ............................ 6193/CHE/2015

(51) Int. Cl.
*H04L 65/611* (2022.01)
*H04W 12/08* (2021.01)
(Continued)

(52) U.S. Cl.
CPC .............. *G09B 5/02* (2013.01); *H04L 63/107* (2013.01); *H04L 63/108* (2013.01); *H04L 65/4076* (2013.01); *H04L 67/18* (2013.01); *H04W 4/08* (2013.01); *H04W 12/08* (2013.01); *H04W 12/61* (2021.01); *H04W 76/14* (2018.02); *H04W 12/63* (2021.01)

(58) Field of Classification Search
CPC .................................................. H04L 65/4076
USPC ........................................................ 709/219
See application file for complete search history.

(56) References Cited

U.S. PATENT DOCUMENTS

| 2013/0283142 A1 | 10/2013 | Farzin |
| 2014/0019562 A1* | 1/2014 | Le Chevalier ........ G06F 40/106 709/206 |

(Continued)

*Primary Examiner* — Frantz B. Jean
(74) *Attorney, Agent, or Firm* — Clayton, McKay & Bailey, PC

(57) ABSTRACT

Systems herein allow a student to share media with other students in a classroom with the permission of a teacher. The student can send a sharing request to a management server with a sender student device. The management server can identify a teacher device and send the sharing request to the teacher device for approval. When the request is granted, the student device can supply an address local to the sender device, from which the media will stream. The management server can send the address and an authentication token to other recipient student devices. The management server can further lock the recipient student devices into the sharing location to ensure that each student device will stream the media. At the request of the teacher device or the sender student device, the streaming can end.

20 Claims, 6 Drawing Sheets

Related U.S. Application Data continuation of application No. 15/055,641, filed on Feb. 29, 2016, now Pat. No. 10,255,819.

(51) Int. Cl.
*H04W 12/61* (2021.01)
*G09B 5/02* (2006.01)
*H04L 67/52* (2022.01)
*H04W 4/08* (2009.01)
*H04L 9/40* (2022.01)
*H04W 76/14* (2018.01)
*H04W 12/63* (2021.01)

(56) References Cited

U.S. PATENT DOCUMENTS

| | | |
|---|---|---|
| 2014/0344420 A1 | 11/2014 | Rjeili |
| 2016/0154975 A1 | 6/2016 | Sorensen |
| 2016/0378422 A1 | 12/2016 | Kenjalkar |
| 2016/0379508 A1 | 12/2016 | Deweese |
| 2017/0070358 A1* | 3/2017 | Svendsen ............... H04L 67/04 |
| 2017/0193848 A1* | 7/2017 | Bonney-Ache ......... H04L 51/22 |
| 2017/0199631 A1* | 7/2017 | Coffman ............. H04L 12/1827 |

* cited by examiner

SYSTEMS FOR CLASSROOM MEDIA SHARING

CROSS-REFERENCE TO RELATED APPLICATIONS

This application is a continuation of U.S. patent application Ser. No. 16/373,332, filed Apr. 2, 2019, entitled "SYSTEMS FOR CLASSROOM MEDIA SHARING," which is a continuation of U.S. patent application Ser. No. 15/055,641, filed Feb. 29, 2016, entitled "SYSTEMS FOR CLASSROOM MEDIA SHARING," issued as U.S. Pat. No. 10,255,819, which claims benefit of priority under 35 U.S.C. 119(a)-(d) to Foreign application Serial No. 6193/CHE/2015 filed in India entitled "SYSTEMS FOR CLASSROOM MEDIA SHARING", on Nov. 17, 2015, by AIRWATCH LLC, all of which are herein incorporated by reference in their entireties for all purposes.

BACKGROUND

Educational institutions, such as schools and universities, constantly seek ways to leverage technology to effectively educate their students. This includes using technology to create an interactive learning atmosphere where ideas can be shared between students. One way educators do this is by projecting media onto a screen where all of the students can view the media.

However, this can involve setup and limits who can act as a presenter. A student cannot easily share media with the rest of the class. The class often must wait while the student connects their mobile student device (e.g., laptop, tablet, or phone) or transfers files to a projection setup. This can be time consuming and interrupt the learning process.

Some schools have attempted to utilize mobile student devices for portions of the learning experience due to the widespread proliferation of these devices. But mobile devices have also proven to be a distraction in the classroom environment, and in some cases, can be used as a tool for cheating. This is especially the case when students can share information between mobile devices. In some cases, teachers ban mobile devices despite potential efficiency benefits over pen and paper, simply because the potential for distractions and cheating is too high.

Other technical complications also keep educators from relying heavily on student devices during class. For example, although a student can post media online for steaming purposes, it can be cumbersome to do so. Additionally, there can be insufficient Internet bandwidth for all of the students in the classroom to access the same streaming media online. Finally, students may navigate away from the online stream and use the Internet in class in distracting ways.

Based on at least these problems with classroom sharing technology, a need exists for systems for classroom media sharing.

SUMMARY

An example media sharing system can include a management server that communicates with a sender device, such as a first student device. The sender device can request permission to stream media to other students in the class by sending a sharing request to a teacher device or some other moderator device. A management server can receive a message from the moderator device that grants the sharing request. The management server can also receive a sharing location indicating where the media can be streamed from the sender device.

The management server can then determine which receiver devices, such as other student devices, will receive the streaming media. This can include identifying multiple receiver devices associated with an environment common to the sender device and the moderator device. The environment can be a single class. The management server can determine the environment based at least on the time of day and an identifier associated with the sender device. For example, a database can store class start and end times, and correlate student and teacher devices to the classes. Using this information, the management server can determine the environment. Alternatively, the sharing request can identify the environment. The management server can use the database information to identify the recipient devices based on the environment.

The management server can send a sharing token to the sender device to permit the media streaming. The management server can also send the sharing location and validation criteria to each of the identified receiver devices. The validation criteria can allow the receiver devices to stream media from the sender device at the sharing location. The validation criteria can be a validation token that is derived from the sharing token. The sender device can match the validation token against the sharing token to validate the recipient before allowing the recipient device to receive the streaming media. The recipient device can stream the media locally if connected over a local network to the sender device.

The management server can also lock the receiver devices into the sharing location so that they cannot stream or download media from other sources. This can include sending a web lock command to prevent the receiver devices from accessing a network location other than the sharing location. Locking the receiver devices can also include sending an application lock command to prevent the receiver devices from running at least one application while streaming the media from the sender device.

It is to be understood that both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described here include systems for classroom media sharing. Unlike current classroom sharing technologies, a system can allow a student device to stream media, such as a presentation, to recipient student devices in the classroom with a teacher's permission. The recipient student devices can be locked into the streaming media. This can prevent the students from navigating away from the media or attempting to access different network content while the media is streaming. This can reduce the potential for cheating while increasing the ease with which permitted media can be shared.

A management server can receive a sharing location that indicates where a first student device will share media. The sharing location can be an address on a local network accessible at a classroom. One example sharing location is a uniform resource location ("URL") that points to the first student device. The management server can determine multiple recipient student devices corresponding to other students in the same classroom as the first student device. The management server can lock the multiple recipient student devices into the sharing location. When the first student device or a teacher device ends the streaming, the lock can be removed by the management server. If class is still in session, the lock can be replaced with a different lock in one example.

Figure 1:
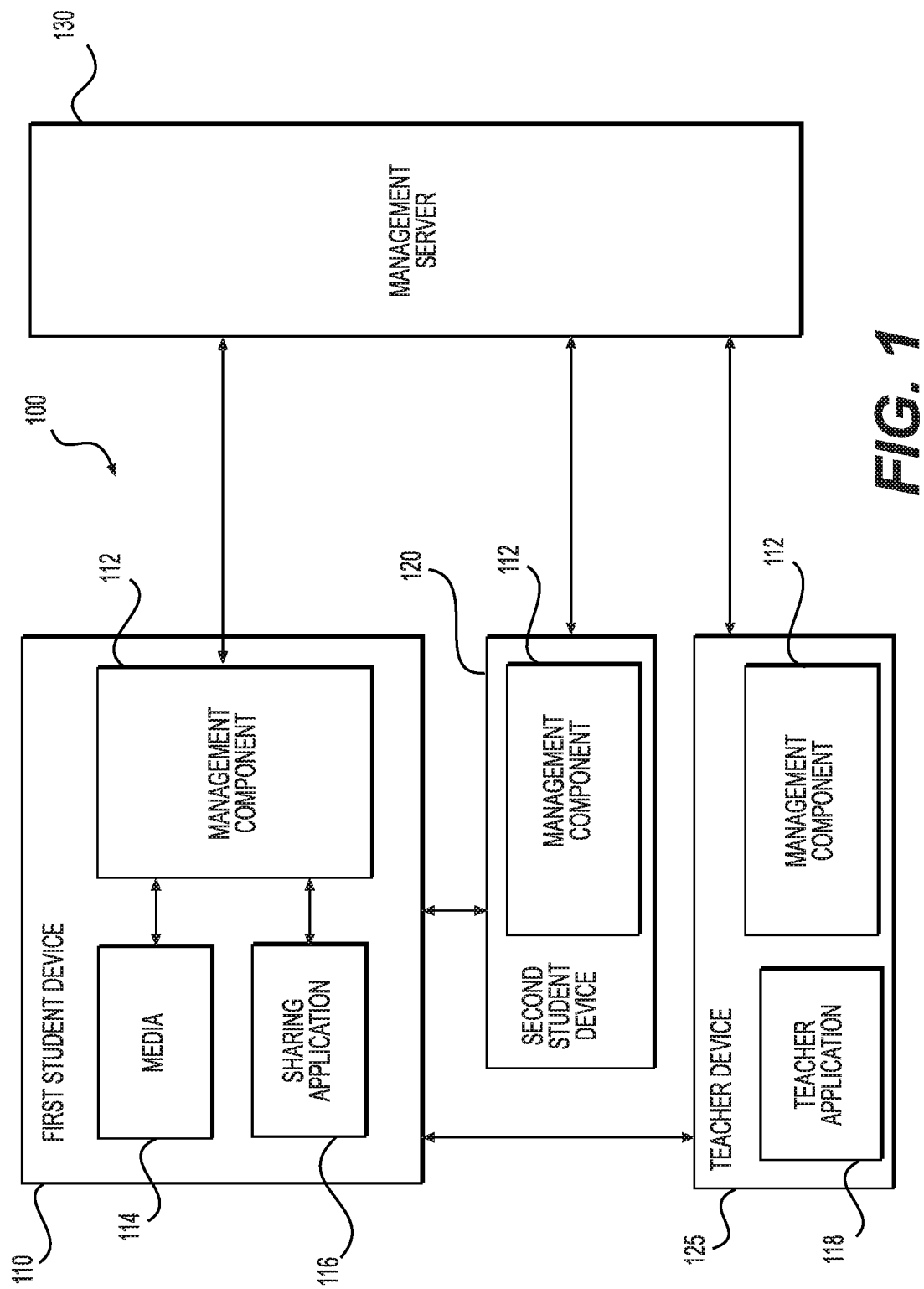
FIG. 1 is an exemplary illustration of system components.

FIG. 1 illustrates an exemplary system 100 for classroom presentation sharing. A first student can use a first student device 110 to share media 114 with other student devices in the classroom, such as second student device 120. The media can be the user's screen or a video file. Streaming the media can allow the first student to share with other students a video, an image, or any type of electronic file, such as a PPT document, PDF, word processor document, or spreadsheet. The terms "student" and "teacher" are not meant to limit the examples and can include any user that shares or receives media based on the technologies described below. For example, the first student device 110 is just one type of sender device, and the second student device 120 is one type of receiver device. The teacher device 125 is one type of moderator device. The term "streaming" can include any technology for providing media 114 over a network.

The first student device 110, second student device 120, and teacher device 125 can be any computing device, such as a cell phone, laptop, tablet, personal computer, or workstation. Each is an example of a user device, and can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The student devices 110 and 120 can execute managed applications, such as a sharing application 116 that can allow a student to request teacher permission to share media 114. The sharing application 116 can be part of or separate from a classroom application that can provide a platform for learning. By managing the sharing application 116 or classroom application, classroom-related files can be isolated from personal files stored on the student device 110 or 120.

Using a management component 112 executing on the first student device 110, a management server 130 can interact with and control functionality of the managed applications. Managed applications can cause a student device 110 or 120 to communicate over a network with the management server 130 to securely access files and receive management-related instructions. For example, the management server 130 can lock the student device 110 into the sharing application 116 or classroom application and determine what functionality or files are accessible within these applications. This can allow a student to use their own student device 110, such as a cell phone, in a classroom environment where classroom-related files can be accessed by communicating with the management server 130.

In one example, the first and second student devices 110 and 120 can communicate with one another and the teacher device 125 through the management component 112 on each device 110, 120, and 125. These communications can occur over a network that is accessible within or outside of a classroom. The network can include a local area network, but can also include the Internet or any other suitable communication platform. The network can also be an enterprise network in one example. The first student devices 110 and 120 and teacher device 125 can communicate over the network using one or more modulators, demodulators, multiplexers, demultiplexers, network communication devices, wireless devices, antennas, modems, and any other type of device configured to enable data communication through a communication network.

In one example, the management server 130 is located remotely from the user devices 110, 120, and 125. The first student device 110 can request permission to share media using the sharing application 116. Using the management component 112, the sharing application 116 can contact the management server 130. The management server can determine which teacher device 125 should receive the request, and send a message to the teacher device 125. The teacher can then grant or deny the sharing request. If the sharing request is granted, the teacher device 125 can send an acceptance message to the management server 130. The management server 130 can then send a sharing token to the first student device 110. The first student device can send a sharing location to the management server 130, the sharing location indicating where the media is available for streaming.

The management server 130 can then determine which recipient student devices should receive the sharing location, based on which other student devices are part of the classroom. In making this determination, the management server 130 can determine which student devices have been counted as present in the classroom, such as through use of a managed classroom application. The management server can then send validation criteria to the recipient devices, including the second student device 120. The recipient devices can use the validation criteria to authenticate themselves to the first student device 110 as permitted recipients. The validation criteria can include a validation token derived from the sharing token. The validation token can be matched against the sharing token for authentication purposes.

The management server 130 can also send the sharing location to the determined recipient student devices, including the second student device 120. The second student device 120 can authenticate itself as a permitted receiver by contacting the sharing location and supplying the authentication token.

The first student device 110 can then stream the media over a local network. The first student device 110 can stream media 114 to the second student device 120 (or teacher device 125) using a peer-to-peer connection without relying on Internet bandwidth for the streaming. Because the sharing location can be at the first student device 110 instead of an outside location, each recipient student device can avoid streaming the media 114 from over the Internet. However, in some examples, sharing can involve routing media 114 over Internet connections.

The management component 112 can include a device-level component. Device-level components can include an application programming interface ("API"), agent application, hypervisor, or virtualized device. The management component 112 can also include an application-level component. The application-level component can include an API, SDK, application wrapper, or workspace agent application. The device-level management component can include system level privileges. The application-level management component can include privileges in managed applications, which can be developed for operation with the management server 130. Reference to the management component 112 is understood to include either or both of the device-level and application-level components unless otherwise specified.

The management server 130 can interact with the management component 112 with application-level calls to the application or device-level calls to the operating system of the first student device 110. In one example, based on a permissions control for a portion of a presentation or slides file, the management server 130 can turn functionality on and off within the managed applications through calling subroutines in the management component 112. If a permission control specifies it, the management server 130 can turn off functionality at the student device 110, such as printing, emailing, or Internet access. This can allow for added security when viewing or editing particularly sensitive portions of a presentation or slides file.

A sharing application 116 can be a managed application in one example. The sharing application 116 can be installed on the first student device 110 from the management server 130 through communications with the management component 112. Likewise, the management server 130 can utilize the management component 112 to uninstall the sharing application 116. This can be done, for example, if the first student device 110 is lost or the school year ends. The management server 130 can also use the management component 112 to set permissions within the sharing application 116. This can include restricting which files the user can open and share, or managing how long the sharing will last.

The management server 130 can, for example, restrict access to certain streams by user group. A user group can be a collection of users stored at the management server 130 that have similar access levels. As an example, a sharing location could be restricted to sharing only with a user group associated with a class. A class could also have multiple user groups within the class, allowing a teacher to restrict a stream regarding test answers only to those users in a group that have already taken the test. The teacher or administrative user can create user groups and move students between various user groups in an example. For example, the teacher device 125 can execute a teacher application 118 as part of the classroom or sharing application 116 that allows the teacher to select and group students for streaming purposes. In one example, the system 100 incorporates a sharing group for each class that the teacher can move students in and out of A graphical representation of students in a class can be presented on a teacher device 125. The teacher can select students or groups of students that are allowed to be recipients of the shared media 114. These selections can be communicated to the management server 130 and used for determining the recipient student devices for a sharing request. The teacher device 125 can also display streaming indicators next to students that are streaming the content in one example. The management server 130 can send the teacher device 125 a list of students that have been locked into a sharing location. This can allow the teacher to quickly determine that the correct students are receiving the media 114.

The sharing application 116 can execute on the first student device 110 and present an option for sharing content. If the user selects to share a file, the user can be prompted to select the file. This can include executing a managed content application to request and retrieve files from locations provided by the management server 130. The file can be a presentation file or other file that the sharing application 116 converts to a video file for streaming in one example.

Selection of the option to share the media 114 can cause the management server 130 to determine the recipient student devices and, at the teacher's permission, lock the recipient student devices into the location of the media stream. The management server 130 can cause the lock to be applied by sending a message to the recipient student devices, including second student device 120, through respective management components 112. The lock can include one or more of an application lock and a web lock. A web lock can include whitelisting or blacklisting web applications or websites, or otherwise restricting web accessibility. In this example, the web lock can include locking web access to only the local sharing location. Application locks can lock a student device into a subset of managed applications or sub-applications within a locked application. In this example, the application lock can include locking the second student device 120 into the share application 116 or a classroom application.

The sharing application 116 can stream the media 114 by executing a server process, such as a process using the Hypertext Transfer Protocol ("HTTP"), on the first student device 110. In another example, first student device 110 executes a Multicast process, such as Multicast over User Datagram Protocol ("UDP"). As another alternative, the first student device 110 can run a streaming process that uses Wi-Fi Direct or Bluetooth, which can allow recipient devices to connect to the first student device 110 without a wireless access point.

The second student device 120, among other recipient student devices, can receive the authentication token and sharing location, and contact the first student device 110 at the sharing location. The management server 130 can further lock the second student device 120 into the sharing location. In one example, the share application 116, classroom application, or management component 112 can also execute on the second student device 120. One or more of these managed applications or components can be locked into the sharing location by the management server 130.

The management server 130 can include one or more servers. Each server can include one or more processors that execute instructions stored on a non-transitory, computer-readable medium. The management server 130 can similarly include one or more servers and processors.

The devices 110, 120, 125 and management server 130 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The devices 110, 120, 125 and management server 130 can also include an I/O module, such as a console with an integrated keyboard and mouse to allow a user to input parameters associated with system 100. An I/O module can also include a display including a graphical user interface ("GUI") for outputting information on a screen.

Although an example has been described where the server application 116, content application, classroom application, and other applications are managed, the applications can also be unmanaged applications. In addition, the management component 112 and management server 130 need not be provided in all examples. For example, the sharing application 116 executing on the first or second student device 110 or 120 can be developed to include the described management component 112 functionality related to media sharing. In this way, an unmanaged sharing application 116 can request permission to share media and accept streaming recipients at the sharing location.

Figure 2:
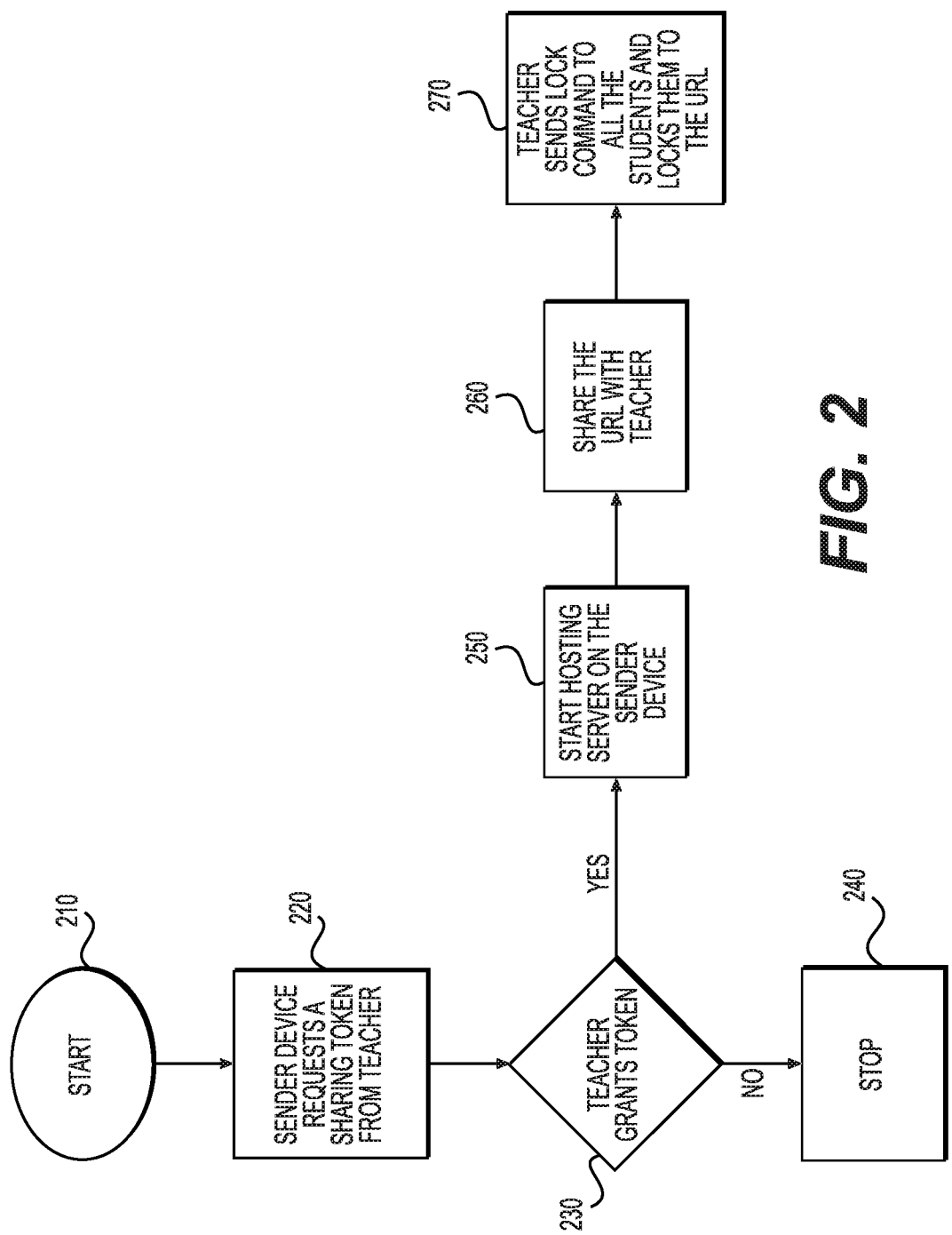
FIGS. 2-4 are exemplary methods executed in a system.

FIG. 2 is an exemplary illustration of a process for streaming content in a classroom. At stage 210, the first student can start the process by selecting a sharing option on the graphical user interface of the first student device 110. The sharing option can be displayed as an icon 508 in the foreground of the display in one example. In another example, the sharing option can be selected in a drop down menu as part of another application, such as the classroom application.

The sharing option can appear and be accessible by students at times that are determined by the management server 130. For example, a teacher or administrative user can set sharing privileges for particular students in advance, based on the lesson plan or scheduled presenters. This can help reduce unwanted or unwarranted sharing requests from students.

At stage 220, the first student device 110 can make a sharing request that includes requesting a sharing token from the teacher. This can include sending a sharing request to the management server 130. The management server 130 can determine the teacher that corresponds to the first student device 110. The request can include a device identifier in one example and, optionally, a description or copy of the content to be shared. In one example, based on the device identifier, the time of day, and the day of the week, the management server 130 can determine which class the first student device 110 is currently part of. The class can be represented by a class identifier. The class identifier can alternatively be provided as part of the sharing request. Using the class identifier, the management server 130 can determine which teacher devices correspond to one or more teachers of the current class.

The management server 130 can then send a message to the identified teacher device 125. The message can cause the teacher device to check with the management server 130 to receive the sharing request.

At stage 230, the teacher can then be presented with an option to grant the sharing request on the teacher device 125. The teacher device 125 can identify the student that is making the sharing request and, in some examples, the content to be shared. This can include displaying information about the media 114, such as a file name, or optionally providing a preview. The teacher device 125 can also identify a time period for which the sharing request will be valid in one example. In another example, the teacher can set the time period that the sharing can last. For example, if a student presentation has a 5 minute time limit, the sharing request can be limited to 5 minutes.

When the teacher selects the option to grant the sharing request, in one example the teacher device 125 can send a message indicating acceptance to the management server 130. In response, the management server can send the sharing token to the first student device 110. In another example, the teacher device 125 can directly supply the sharing token to the first student device 110 over a local network. In that example, the teacher device 125 can already have received the sharing token from the management server 130 with the sharing request.

If, at stage 230, the teacher selects an option to decline the sharing request, the management server 130 can send a refusal message to the first student device 110. The same can occur if the sharing request times out. Alternatively, the teacher device 125 can directly communicate the refusal to the first student device 110 over a local network. At stage 240, this can stop the process of streaming media 114 in a classroom.

Otherwise, in response to receiving a sharing token, at stage 250 the first student device 110 can execute a server process to host the media 114. This can cause the first student device 110 to act as a sender device, and other student devices that connect to it to behave as receivers. As previously stated, executing a server process can include using HTTP on the first student device 110. In another example, first student device 110 executes a Multicast process, such as Multicast over UDP. As another alternative, the first student device 110 can run a streaming process that uses Wi-Fi Direct or Bluetooth, which can allow recipient devices to connect to the first student device 110 without a wireless access point.

The sharing application 116 can cause the first student device 110 to designate a sharing location where recipient devices can connect to stream the media 114. The sharing location can be local, such as on the first student device 110, eliminating the requirement for streaming from a remote content server. This can allow a class full of students to stream the media 114 without running into issues involving a lack of Internet bandwidth. For an HTTP server process, the sharing location can be a URL that points to a location on the first student device 110. Alternatively, a Multicast address can be chosen from a pool of addresses designated by an Internet Engineering Task Force ("IETF").

The first student device 110 can send the sharing location to the teacher device 125 at stage 260. In one example, the teacher device 125 can begin streaming the media 114, giving the teacher an opportunity to view the media 114 before sending a command that will cause the other student devices to stream the media 114. In another example, the management server 130 sends the sharing location and a validation token to the other student devices associated with the class in response to the teacher granting the sharing request in stage 230.

To stream a file, the first student device 110 can store a temporary copy of the file. This can include converting the file, such as a presentation, to video. The presentation can be converted to video by capturing screen frames and adding the frames to a video file in one example. The temporary file can be marked or encrypted with the sharing token in one example. To decrypt and view the stream, a receiving student device can use a copy of the share token or another validation token that is derived from the share token. For a Multicast stream, instead of converting a presentation to a video file, screen frames can be sent serially as part of the stream.

In another example, a timestamped token is sent as the first byte in the stream. A recipient student device 120 can check the timestamped token against the validation token they received from the teacher device 125 or management server 130. If a match exists, the recipient student device 120 can begin streaming the content at the sharing location.

To facilitate the streaming, the sharing application 116 can execute code such as shown below in Table 1.

TABLE 1

```
int port = 5900;
InetAddress local = InetAddress.getByName(Multicast IP Address);
DatagramPacket p = new DatagramPacket(messageToMultiCast.getBytes( ),
    messageToMultiCast.length( ), local, port);
MulticastSocket s = new MulticastSocket(port);
s.joinGroup(InetAddress.getByName(Multicast IP Address));
s.send(p);
s.close( );
```

As shown in Table 1, the sharing application 116 can retrieve a local IP address to utilize as a sharing location. The sharing application 116 can then create a DatagramPacket using the content to be multicast (which can be represented in Table 1 by messageToMultiCast), along with the sharing location and a port for access. A new Multicast socket can then be created at the port for recipient devices to connect for streaming from the sharing location. The Multicast socket can gather the content at the sharing location and send packets to recipient devices. When the streaming is complete, the Multicast socket can close.

The second student device 120 can receive the stream by executing code as part of the sharing application 116 or management component 112, such as shown in Table 2.

TABLE 2

```
int port = 5900;
byte[ ] message = new byte[65536];
DatagramPacket p = new DatagramPacket(message, message.length);
MulticastSocket s = new MulticastSocket(port);
s.joinGroup(InetAddress.getByName(Multicast IP Address));
s.receive(p); // blocks until something is received
//get sender IP and content ID
String senderAddress = (p.getAddress( )).getHostAddress( );
text = new String(message, 0, p.getLength( )."UTF-8");
```

The sharing application 116 can establish a new instance of a Multicast Socket using the same port as on the first student device 110, which is the sending device. Then, the second student device 120 can join the Multicast at the sharing location. The sharing application 116 can also display the sharing location and identify the media 114 in an example.

At stage 270, the recipient student devices, such as second student device 120, can be locked into the sharing location, such as a URL. This can be a command that originates when the teacher grants the sharing request in one example. In another example, the teacher can separately lock or unlock student devices to and from the streaming media 114. For example, using a classroom application interface, such as the GUI 605 shown in FIG. 6, the teacher can lock student devices, including second student device 120, into the sharing location. This can be provided as part of a managed classroom or teacher application 118 in an example.

The management server 130 can cause the second student device 120 to be locked into the sharing location. After identifying which student devices should be locked, the management server 130 can send a message to those student devices through the management component 112. The student devices can then check with the management server 130 to receive the lock instruction. The lock instruction can include both a web lock and an application lock in one example. The web lock can restrict the second student device 120 from accessing network or Internet addresses other than the local sharing location. The application lock can prevent the second student device 120 from opening applications that are not part of a whitelist in one example. This can prevent, for example, a student from recording the media 114 or playing a video game while the media 114 is streaming. The teacher device 125 or management server 130 can also automatically determine a type of lock command based on the content being shared. For example, sharing a WORD document can cause a lock command to lock recipients into a program used to open WORD documents.

The streaming can end by election of the sender, the teacher, or based on time. In one example, the sharing application 116 presents an option to end the stream that the student can select. In another example, the teacher can terminate the streaming by selecting an option on the teacher device 125. The first student device 110 can close the server process so that the sharing location no longer is accessible and send a termination message to the management server 130 in one example. In an example, the termination message can require teacher approval. The management server 130 can then send unlock messages to the recipient student devices so that they will no longer be locked into the sharing location.

In another example, the share token can be a timed token. When the token expires, the first student device 110 can terminate the server process. Additionally, the validation tokens used by the recipient student devices can include the timing information. If the time limit in the validation token has been reached, the server process or share application 116 can deny the second student device 120 access to the media 114.

Figure 3:
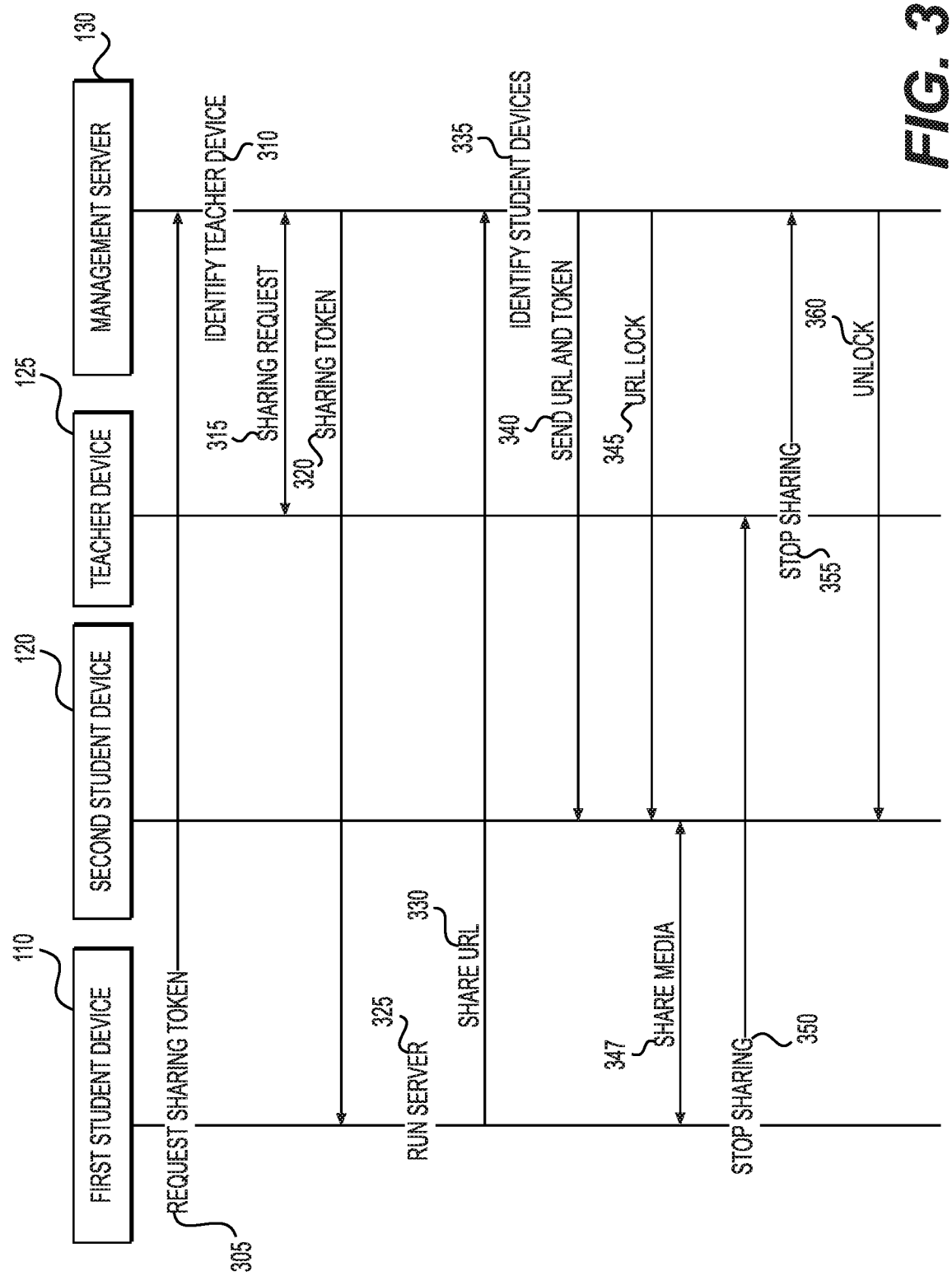

FIG. 3 is an exemplary illustration of a method for sharing a presentation or other media 114 from a first student device 110. At stage 305, the first student device 110 can request a sharing token. The token can be requested as part of a sharing request. In one example, the first student device 110 contacts the management server 130 to make the request. The sharing application 116 can utilize the management component 112 to contact the management server 130.

At stage 310, the management server 130 can identify the teacher device 125 that corresponds to the first student device 110, as also explained with regard to stage 220 of FIG. 2. The sharing request can include one or more of a class identifier, a device identifier, and a time stamp in one example. In one example, based on at least one of the class identifier, device identifier, the time of day, and the day of the week, the management server 130 can determine which class the first student device 110 is currently part of. The management server 130 can maintain a database that relates students and teachers to their respective user devices, and relates students and teachers to classes. The database can also store which days and times each class meets. Using the device identifier of the first student device 110, the day, and time, the management server 130 can identify which teacher device(s) correspond to the current class that the student is attending. The management server 130 can also store attendance records, and ensure that the first student device 110 is in attendance before forwarding the sharing request to the teacher device 125.

Figure 6:
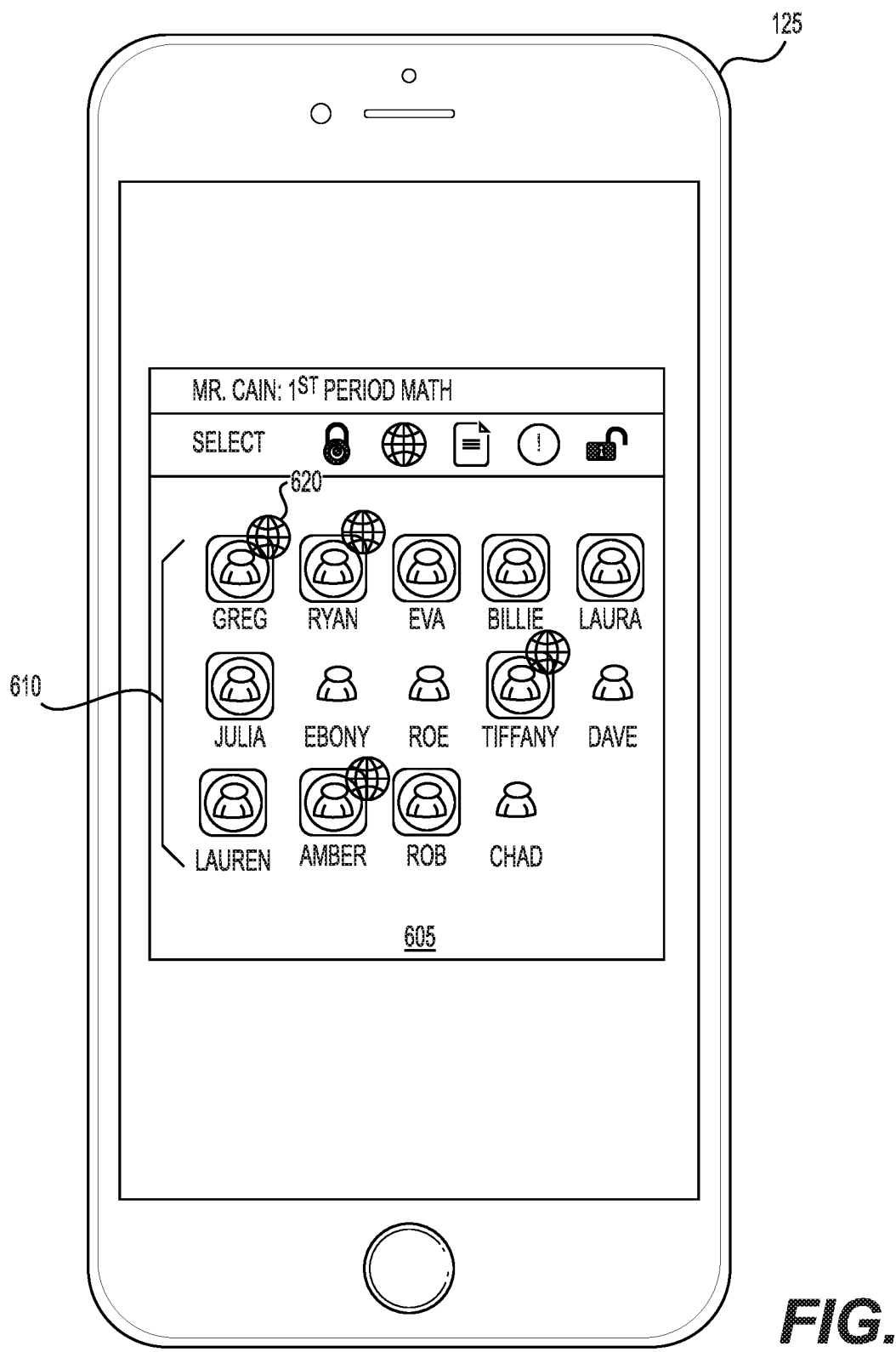

At stage 315, the sharing request can be sent to the identified teacher device 125 for approval. The teacher device 125 can present an option for the teacher to allow or reject the sharing request. In one example, the teacher device 125 can also allow the teacher to set a time limit on the sharing. Additionally, the teacher can select which students or groups of students can receive the media 114 in one example. For example, the teacher can select students to receive the media 114 on an interface, as shown in FIG. 6. These selections can be communicated back to the management server 130, where they can be used to generate a sharing token that is sent to one or more recipient student devices, such as second student device 120.

In one example, the management server 130 does not send a sharing token to the first student device 110 until the teacher device 125 approves the sharing request. However, in another example, at stage 315 the management server 130 sends a sharing token to both the teacher device 125 and the first student device 110. The teacher device 125 can also be sent a sharing location at the first student device 110. This can allow the teacher device 125 to preview the media 114 at the first student device before accepting the sharing request and allowing the second student device 120 to stream the media 114.

Upon teacher approval, at stage 320 the management server 130 can send a sharing token to the first student device 110. At stage 325, the first student device 110 can execute the server process, as previously described.

At stage 330, the first student device can send the sharing location, such as a URL, to the management server 130. This can allow the management server to supply the sharing location to the second student device 120. In one example, step 320 can occur in conjunction with stage 305 to reduce the number of communications to the management server 130 and allow the teacher device 125 to preview the media 114.

At stage 335, the management server 335 can identify recipient student devices. This can include determining other student devices that are associated with the class identifier that are also marked as present. In one example, this can include determining which student devices the teacher has marked as eligible to receive the media 114.

At stage 340, the management server 130 can send a validation token and sharing location to the identified recipient student devices, including the second student device 120. The validation token can be a copy of the sharing token in one example. Alternatively, the validation token can be derived from the sharing token, such that the validation token causes the first student device 110 to validate the recipient based on comparison with the sharing token. The second student device 120 can contact the first student device 110 at the sharing location and present the validation token to begin streaming. Upon validation, at stage 347 the first student device 110 can share the media 114 with the second student device 120. Sharing, such as streaming, can continue until an event occurs to stop the sharing.

At stage 345, the management server 130 can send a lock command to lock the second student device 120 into the sharing location. The lock command can include a web lock in one example. The web lock can include a whitelist of network locations that the second student device 120 can visit. The sharing location can be among the addresses in the whitelist, or can be the only address in the whitelist. The lock command can also include an application lock. The application lock can lock the second student device 120 into a managed application, such as sharing application 116, that can stream the media 114 from the sharing location. The application lock can alternatively use a whitelist or blacklist to limit functionality within one or more applications. Example functionality that can be turned on and off can include emailing, texting, and recording. This can prevent the student from doing other potentially distracting activities on the second student device 120 while the media 114 is streaming.

In one example, the management server 130 sends a message to the second student device 120 to cause the second student device 120 to retrieve the sharing location, validation token, and lock command. The message can be sent by a messaging server that is selected based on the operating system of the second student device 120. For example, a first messaging server can send a message to an ANDROID device and a second messaging server can send a message to an APPLE device. In one example, the management server 130 can determine which messaging server to use based on operating system information for the second student device 120 stored in a database. Alternatively, a student device record can include a correlation to a messaging server to user for that student device. A similar messaging process can be used later for unlocking the second student device 120 at stage 360.

The sharing application 116 can present a termination option at the first student device 110 to stop the sharing. When the user selects the termination option, at stage 350, the first student device 110 can stop streaming in one example. In another example, the first student device 110 sends a termination request to the teacher device 125 to request permission to stop sharing. The termination request can be sent locally in one example, or through the management server 130 in another example. At stage 355, the teacher device 125 can grant the termination request, and send a termination message to the management server. Alternatively, the teacher device 125 can unilaterally terminate the sharing when an option is selected on the teacher device 125 or when the sharing time limit expires.

When the management server 130 receives a termination message, at stage 360 the management server 130 can send an unlock command to the second student device 120 and other recipient student devices. The management server 130 can apply a previous lock setting for classroom activity, such as locking the second student device 120 into a classroom application.

In addition to locking the receiving devices, the teacher device 125 or management server 130 can also lock the transmitting first student device 110 to ensure that a user does not switch to sharing unauthorized content. For example, the first student device 110 can be locked into the sharing application 116 and the option to select other media 114 within the sharing application 116 can be disabled.

Figure 4:
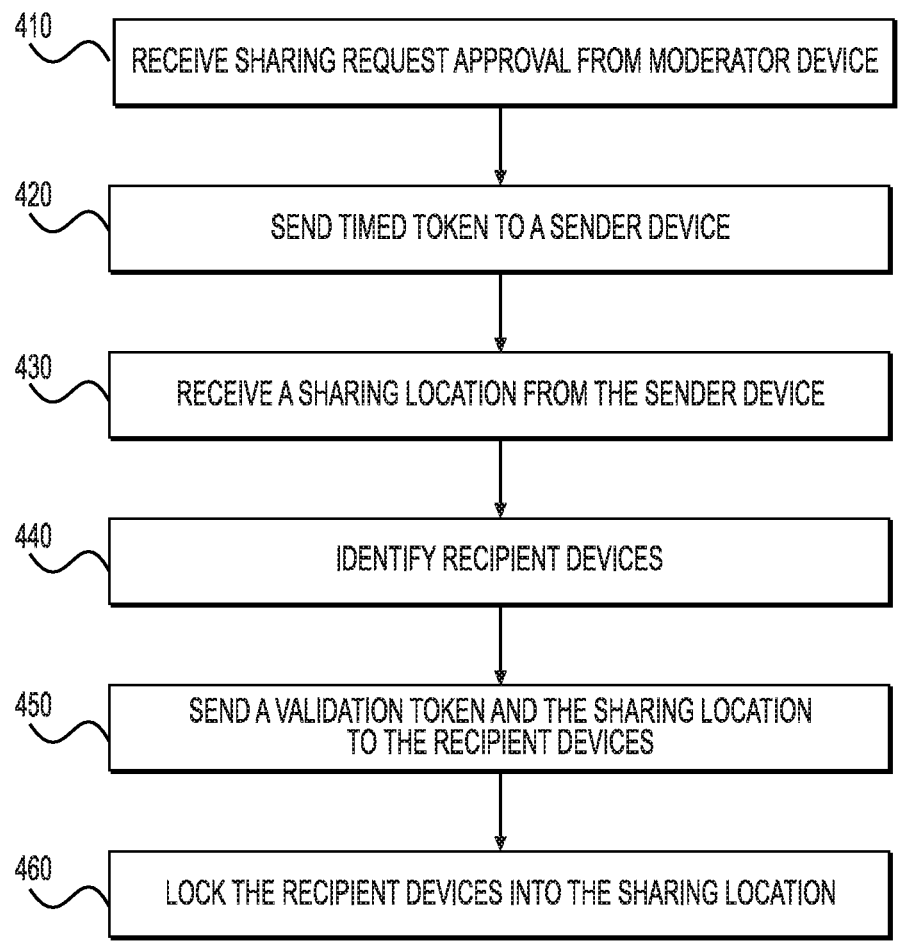

FIG. 4 is an exemplary method performed by a management server 130 in one example. The management server 130 can be part of the teacher device 125 in some examples. At stage 410, the system can receive a sharing request approval from a moderator device. The moderator can be a teacher in one example. Other moderators are also possible. The approval can be in response to a sharing request sent from a sender device.

At stage 420, a sharing token can be sent to the sender device that made the sharing request. The sender device can be a student device in one example. In another example, the sender device is a computing device used in an enterprise work setting. The sharing token can be a timed token, allowing the sender device to stream media 114 according to timing information in the timed token. The timing information can include an expiration time in one example. The timing information can also include a time limit that begins when the streaming begins. Alternatively, the timing information can include a time window with start and end times during which streaming can take place.

At stage 430, the system can receive a sharing location from the sender device. In one example, the sharing location is received with the approval in stage 410.

At stage 440, the system can identify recipient devices. The recipient devices can be identified based on an environment identifier associated with the sender device and the moderator device. An example environment is a classroom. However, other environments, such as a work team or group, are possible. In one example, the system determines the environment, such as which class, work group, or meeting that the sender device is in. Based on determining the environment, the system can identify the recipient devices associated with that environment.

At stage 450, the system can send a validation token and the sharing location to the identified recipient devices. The validation token can be the same as or a derivative from the sharing token. The validation token can allow the recipient devices to access the media at the sharing location when the sender device compares the validation token to the sharing token.

At stage 460, the system can lock the recipient devices into the sharing location. This can be done by sending a lock command to the management component 112 on the recipient devices. In one example, the system sends a message to the management component 112, causing the recipient devices to check with the management server 130 to receive or request the lock command. The lock command can include a web lock and application lock in one example. The lock command can also be sent to the sender device. The lock command can disable browsing commands (e.g., forward and back), disable portions of keyboard or mouse entry, disable switching between files or applications, and otherwise restrict a user to viewing specific content. Once the sharing is completed or terminated, the management server 130 can remove the lock command.

Figure 5:
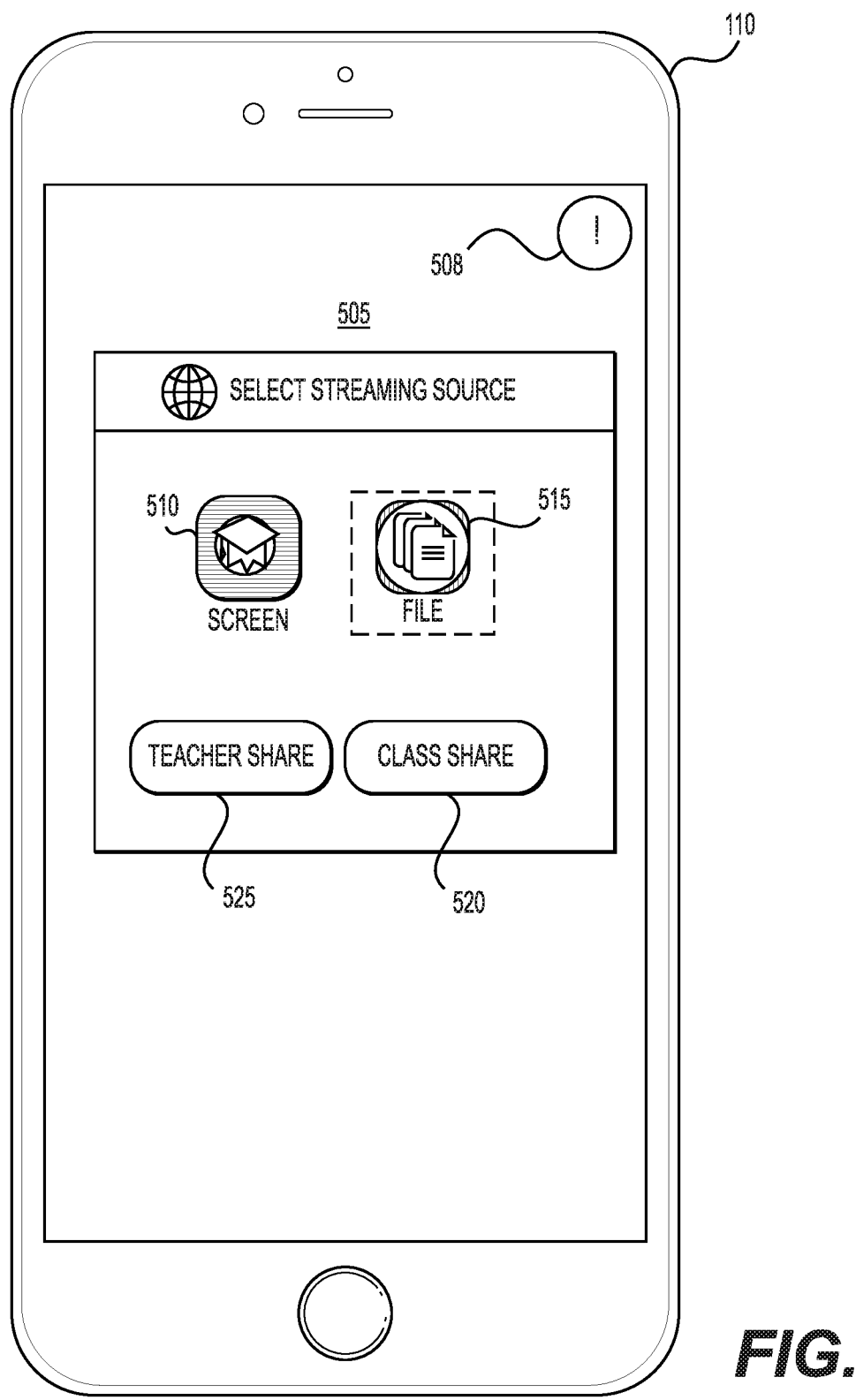
FIGS. 5-6 are exemplary illustrations of a graphical user interface.

FIG. 5 is an exemplary illustration of a graphical user interface 505 that can be part of the sharing application 116 or another managed application in an example. The graphical user interface 505 can display on the first student device 110 and allow the student to create a sharing request. An icon 508 can be present in the foreground of a user interface of the first student device 110. When selected, the sharing application 116 can allow the student to request sharing of their screen or other content. In the example of FIG. 5, the student can select a first option 510 to share their screen or a second option 515 to share a file. Other sharing options, such as drop-down menu options are also possible. If the user selects to share a file, the user can be prompted to select the file. This can include executing a managed content application to request and retrieve files from locations provided by the management server 130. The file can be a presentation file or other file that the sharing application 116 converts to a video file for streaming in one example. As previously explained with respect to FIG. 1, the student device 110 can utilize various technologies to stream the media 114, and can create a temporary video file from screen captures or from pages or slides of a document in some examples.

In one example, the sharing application 116 includes a first option 520 to stream media 114 to the entire class. This can cause the management server 130 to determine the recipient student devices and, at the teacher's permission, lock the recipient student devices into the location of the media stream. In the example of FIG. 5, the student can also select between sharing with the teacher 525 and sharing with the entire class 520. Sharing with the teacher can allow the teacher to preview the media 114 in one example. In another example, the teacher device 125 provides a preview before the teacher determines whether the student can share the media 114 with the other student devices.

FIG. 6 is an exemplary illustration of a graphical user interface 605 that can be part of the sharing application 116, classroom application, or another managed application on the teacher device 125. The teacher can be presented with visual representations of the students 610 in a class. In this example, the environment is a first period math class.

When the teacher device 125 receives a sharing request, the teacher can select which students should receive the associated media. In one example, the teacher can select an option for all present students to receive the request. In another example, the teacher can manually select students from the student representations 610 on the graphical user interface 605. The teacher's selections can be sent to the management server 130 for use in identifying receiver devices for the stream.

Additionally, granting the sharing request can automatically cause the management server to lock the receiver devices into the sharing location. However, in another example, the teacher can manually lock a second student device into the sharing location by applying locks available on the graphical user interface 605. For example, the teacher can select one or more recipients and then select a lock type. The lock request can be sent to the management server 130, which then can send corresponding lock commands to the selected student devices and, optionally, the sender device.

The graphical user interface 605 can also graphically represent which students are streaming the media 114. For example, an icon 620 can display next to students that are successfully streaming. An additional or different icon can display to indicate that the student device is also locked into the sharing location.

Other examples of the disclosure will be apparent to those skilled in the art from consideration of the specification and practice of the examples disclosed herein. The examples are not limited to a classroom environment, and may be applied to workplace and other environments. For example, a corporation can include multiple environments for different teams and groups within the corporation. Alternatively, a meeting can be an environment that includes a moderator device and multiple user devices that can act as sender or receiver devices. Likewise, examples can also be utilized by users that are not teachers and students.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for sharing media, comprising:
receiving a sharing request at a teacher device from a sender device;
in an instance when the sharing request is permitted based on a selection on a graphical user interface at the teacher device, sending a message that grants the sharing request to the sender device;
sending, to receiver devices, validation criteria and a sharing location at the sender device,
wherein the receiver devices stream the media from the sharing location at the sender device by using the validation criteria, and
wherein the receiver devices are identified based on being associated with an environment common to the sender device; and
sending a lock command to the receiver devices, the lock command locking the receiver devices into the sharing location during streaming.

2. The method of claim 1, wherein the message includes a sharing token, and wherein the validation criteria include a validation token that is derived from the sharing token.

3. The method of claim 1, wherein locking the receiver devices includes sending a web lock command to the receiver devices, the web lock command preventing the receiver devices from accessing a network location other than the sharing location.

4. The method of claim 1, wherein locking the receiver devices includes sending an application lock command to the receiver devices, the application lock command preventing the receiver devices from running at least one application while streaming the media from the sender device.

5. The method of claim 1, wherein the environment is indicated by at least the time of day and an identifier associated with the sender device.

6. The method of claim 1, wherein the sharing location includes a uniform resource locator that indicates a location at the sender device.

7. The method of claim 1, wherein the teacher device begins streaming the media as a preview prior to sending the sharing location to the receiver devices, and wherein the teacher device receives an approval of the preview as a prerequisite to the receiver devices streaming the media.

8. A non-transitory, computer-readable medium containing instructions executed by at least one processor to perform stages for sharing media, the stages comprising:
receiving a sharing request at a teacher device from a sender device;
in an instance when the sharing request is permitted based on a selection on a graphical user interface at the teacher device, sending a message that grants the sharing request to the sender device;
sending, to receiver devices, validation criteria and a sharing location at the sender device,
wherein the receiver devices stream the media from the sharing location at the sender device by using the validation criteria, and
wherein the receiver devices are identified based on being associated with an environment common to the sender device; and
sending a lock command to the receiver devices, the lock command locking the receiver devices into the sharing location during streaming.

9. The non-transitory, computer-readable medium of claim 8, wherein the message includes a sharing token, and wherein the validation criteria include a validation token that is derived from the sharing token.

10. The non-transitory, computer-readable medium of claim 8, wherein locking the receiver devices includes sending a web lock command to the receiver devices, the web lock command preventing the receiver devices from accessing a network location other than the sharing location.

11. The non-transitory, computer-readable medium of claim 8, wherein locking the receiver devices includes sending an application lock command to the receiver devices, the application lock command preventing the receiver devices from running at least one application while streaming the media from the sender device.

12. The non-transitory, computer-readable medium of claim 8, wherein the environment is indicated by at least the time of day and an identifier associated with the sender device.

13. The non-transitory, computer-readable medium of claim 8, wherein the sharing location includes a uniform resource locator that indicates a location at the sender device.

14. The non-transitory, computer-readable medium of claim 8, wherein the teacher device begins streaming the media as a preview prior to sending the sharing location to the receiver devices, and wherein the teacher device receives an approval of the preview as a prerequisite to the receiver devices streaming the media.

15. A system for sharing media, the system comprising:
a non-transitory, computer-readable medium that contains instructions;
a processor that executes the instructions to perform stages including:
receiving a sharing request at a teacher device from a sender device;
in an instance when the sharing request is permitted based on a selection on a graphical user interface at the teacher device, sending a message that grants the sharing request to the sender device;
sending, to receiver devices, validation criteria and a sharing location at the sender device,
wherein the receiver devices stream the media from the sharing location at the sender device by using the validation criteria, and
wherein the receiver devices are identified based on being associated with an environment common to the sender device; and
sending a lock command to the receiver devices, the lock command locking the receiver devices into the sharing location during streaming.

16. The system of claim 15, wherein the message includes a sharing token, and wherein the validation criteria include a validation token that is derived from the sharing token.

17. The system of claim 15, wherein locking the receiver devices includes sending a web lock command to the receiver devices, the web lock command preventing the receiver devices from accessing a network location other than the sharing location.

18. The system of claim 15, wherein locking the receiver devices includes sending an application lock command to the receiver devices, the application lock command preventing the receiver devices from running at least one application while streaming the media from the sender device.

19. The system of claim 15, wherein the environment is indicated by at least the time of day and an identifier associated with the sender device.

20. The system of claim 15, wherein the teacher device begins streaming the media as a preview prior to sending the sharing location to the receiver devices, and wherein the teacher device receives an approval of the preview as a prerequisite to the receiver devices streaming the media.

* * * * *